L. B. JOHNSON.
LIQUID COOLER.
APPLICATION FILED DEC. 5, 1910.
1,001,960.
Patented Aug. 29, 1911.
2 SHEETS—SHEET 1.
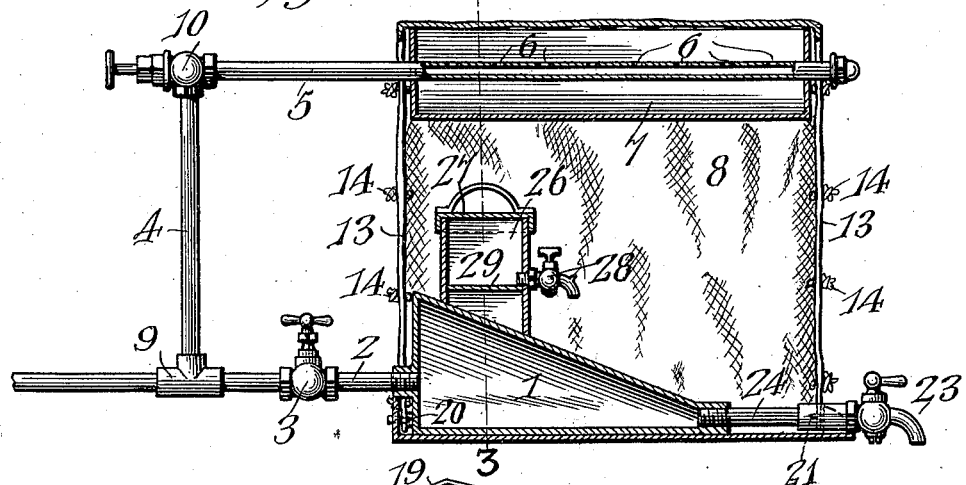
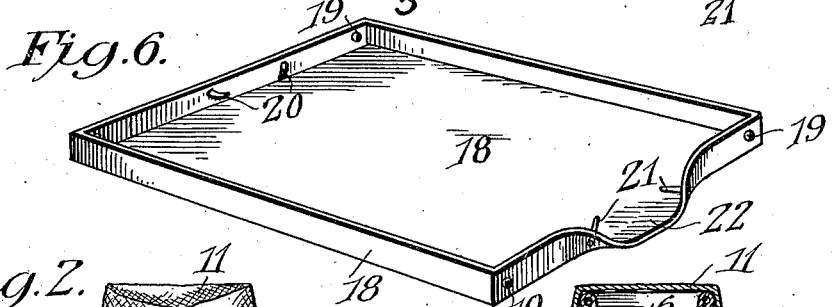
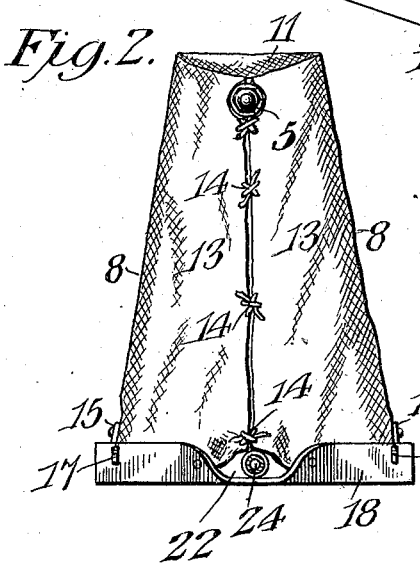 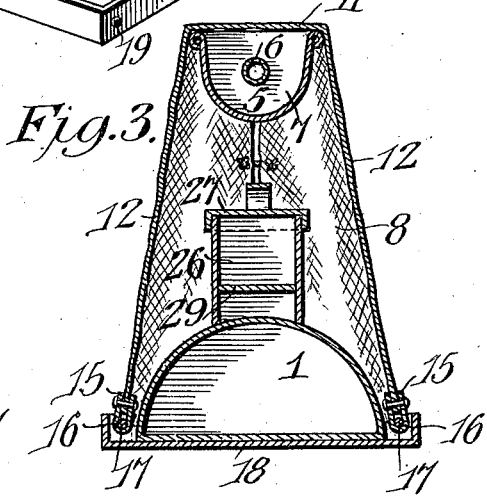
WITNESSES
Little B. Johnson, INVENTOR
BY
ATTORNEY

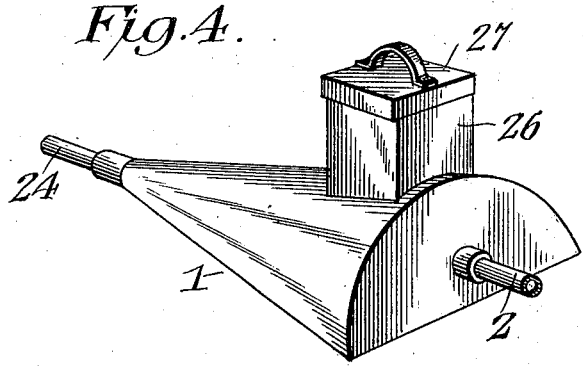
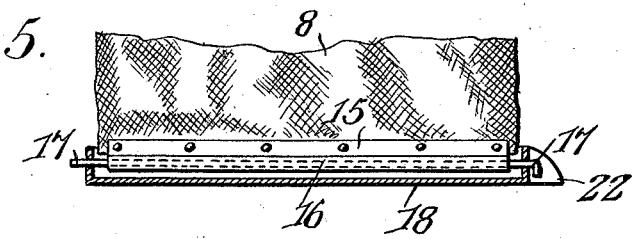
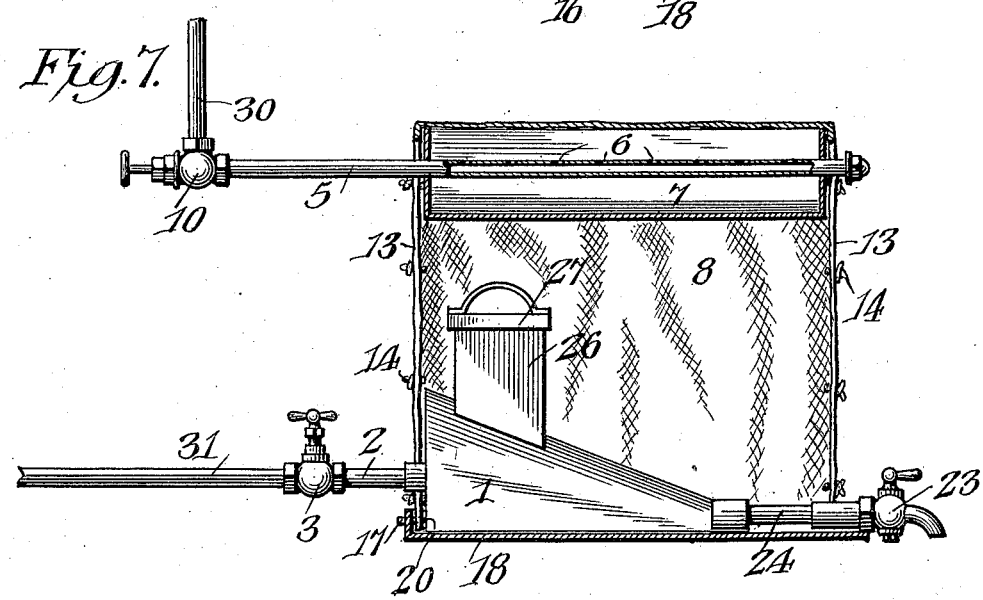
Little B. Johnson, INVENTOR

UNITED STATES PATENT OFFICE.

LITTLE B. JOHNSON, OF FRESNO, CALIFORNIA.

LIQUID-COOLER.

1,001,960.  Specification of Letters Patent.  Patented Aug. 29, 1911.

Application filed December 5, 1910. Serial No. 595,787.

*To all whom it may concern:*

Be it known that I, LITTLE B. JOHNSON, a citizen of the United States, residing at Fresno, in the county of Fresno and State of California, have invented a new and useful Liquid-Cooler, of which the following is a specification.

The invention relates to improvements in liquid coolers.

The object of the present invention is to improve the construction of liquid coolers, and to provide a simple, efficient and comparatively inexpensive cooler, adapted for cooling water, milk, or other liquid, and designed especially for use in connection with a city or other water supply, and capable of utilizing the same for supplying the cooler with drinking water and also for spraying or sprinkling the cooler to reduce the temperature thereof through the evaporation of such moisture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a central vertical longitudinal sectional view of a cooler, constructed in accordance with this invention, and arranged for cooling water for drinking purposes. Fig. 2 is an end elevation, the outlet of the tank being in section. Fig. 3 is a transverse sectional view on the line 3—3 of Fig. 1. Fig. 4 is a detail perspective view of the tank. Fig. 5 is a detail sectional view, taken longitudinally of one side of the pan, illustrating the manner of securing the fabric covering to the same. Fig. 6 is a detail view of the drip pan. Fig. 7 is a longitudinal sectional view, the apparatus being arranged for cooling milk, or a liquid other than water.

Like numerals of reference designate corresponding parts in all the figures of the drawings.

In Figs. 1 to 6 inclusive in which is illustrated the preferred embodiment of the invention, the apparatus, which is arranged for cooling water for drinking purposes, comprises in its construction a tank 1, constructed of sheet metal, or other suitable material and preferably of substantially semi-conical shape, being tapered longitudinally and curved in cross section and having a flat bottom and a vertical rear wall, which is pierced by a water supply pipe 2. The water supply pipe 2, which may be connected with the service pipe of the water supply of a city, or with any other suitable source of supply, is provided with a valve 3 for controlling the flow of water to the tank 1. The water supply pipe 2 is also connected by an upwardly extending vertical branch pipe 4 with a horizontal spray pipe 5, provided with a plurality of fine perforations 6, located within a trough 7 and adapted to supply water to the same for moistening or saturating an absorbent fabric covering 8. The branch pipe 4 is connected with the water supply pipe beyond the valve 3, which does not affect the flow of water to the trough, but only to the tank 1. The lower end of the branch pipe 4 is rigidly connected with the water supply pipe 2 by a T-shaped coupling 9, and its upper end is connected with the spray pipe by a valve 10, and it serves to support the supply pipe and the trough in an elevated position above the tank. The valves may be of any preferred type and by their arrangement the flow of water to the trough and to the tank may be independently controlled.

The trough, which is constructed of sheet metal, or other suitable material, is approximately semi-cylindrical, and the spray pipe pierces the end walls of the trough, which is open at the top. The perforations of the spray pipe are preferably located at the top, as shown, so as to discharge water upon the top portion of the covering, which extends across the trough. By arranging the spray pipe within the tank beneath the absorbent covering, there is no waste of water and the entire evaporation of the same contributes to the cooling of the tank. The tank may be supplied with water in any other preferred manner, and the water flowing over the sides of the trough will moisten or saturate the absorbent covering. Perforations, however, may be arranged at any other points, and the absorbent covering, which is designed to be constructed of burlap or other suitable material, is substantially in the form of a tent and consists of a horizontal top portion 11, inclined sides 12 and end flaps 13, which are equipped with fastening means 14, consisting of short cords or ties, but any other fastening means may be employed. The sides of the covering are provided at their lower edges with metallic binding strips 15, folded longitudinally to provide two sides or flanges and forming longitudinal beads or casings 16 at the lower edges of the inclined sides for the reception of rods 17, which pierce the front and rear walls of a drip pan 18, and secure the latter to the absorbent covering.

The drip pan is fitted against the bottom of the tank and it is supported in position by the absorbent covering, and it is provided in its front and rear walls with perforations 19 for the rods 17, and it has pins or prongs 20 and 21 projecting from the central portions of its front and rear walls for engaging the end flaps of the covering to hold the same taut. The pins or prongs are located at the inner faces of the end walls, and the perforations 19 are spaced from the side walls, so that the lower edges of the absorbent covering are received within the drip pan. The front wall of the drip pan is also provided at its central portion with a recess or outlet 22, receiving a faucet 23 of the tank, and also permitting water within the pan to flow from the front thereof. The faucet 23, which is arranged exteriorly of the absorbent covering, is connected by a short pipe 24 with the front end of the tank.

The water cooler may be used either out doors or in doors, and when used within a house it may be conveniently arranged over a sink, so that the water from the drip pan may flow into the sink.

The tank is equipped at the top with an ice box or receptacle 26, provided with a removable cover 27 and having a drain cock or faucet 28, arranged adjacent to the plane of the bottom 29 of the box or receptacle and designed for use only when the tank is separated from the rest of the apparatus, and the same may then be placed in a box of saw dust, or other material, which is a non-conductor of heat.

In Fig. 7 of the drawings is illustrated another form of the invention in which the spray pipe 5 is connected with a water pipe 30, extending to any suitable source of supply. The tank in this form of the invention is designed for cooling milk, or any liquid other than water, and the supply pipe 31 is designed to extend to a suitable pan or receptacle for supplying the tank with a liquid to be cooled. The milk or other liquid may be supplied to the tank in any other desired manner.

Having thus fully described my invention, what I claim as new and desire to secure by Letters Patent, is:—

1. An apparatus of the class described including a tank, an absorbent covering receiving the tank, a trough located above the tank and supporting the covering and adapted to moisten the same, and a spray pipe located within the trough beneath the absorbent covering and provided with perforations for discharging water upon the inner face of the absorbent covering.

2. An apparatus of the class described including a tank, an absorbent covering receiving the tank and extending above the same, an approximately semicylindrical trough located above the tank and supporting the absorbent covering, the latter being extended across the top of the trough, and a spray pipe for applying moisture to the absorbent material.

3. An apparatus of the class described including a drip pan, a tank arranged in the drip pan, a trough located above the tank, an absorbent covering of substantially the form of a tent extending across the top of the trough and having inclined sides, the lower edges of the covering being arranged within the drip pan, and means for supplying moisture to the absorbent material.

4. An apparatus of the class described including a drip pan, a tank arranged in the drip pan, a trough located above the tank, an absorbent covering of substantially the form of a tent extending across the top of the trough and composed of inclined sides and end flaps detachably secured together, the lower edges of the covering being secured within the drip pan, and means for supplying moisture to the absorbent material.

5. An apparatus of the class described including a drip pan, a tank arranged in the drip pan, an absorbent covering receiving the tank and connected with the drip pan and supporting the same, and means located within the absorbent covering for supplying moisture to the same.

6. An apparatus of the class described including a drip pan, a tank arranged in the drip pan, an absorbent covering receiving the tank and having inclined sides extending into the pan, rods piercing the walls of the pan and detachably securing the same to the absorbent material, and means located between the inclined sides of the absorbent material for supplying moisture to the latter.

7. An apparatus of the class described including a drip pan, a tank arranged in the drip pan, an absorbent covering receiving the tank and having sides extending downward from a point above the tank to the drip pan and provided at their lower edges with metallic binding strips forming casings, fastening means piercing the walls of the pan and extending into the said casings and securing the absorbent covering to the pan, and means located between the sides of the absorbent covering for supplying moisture to the same.

8. An apparatus of the class described including a tank, a superimposed trough, water supply pipes connected with the tank and with the trough and supporting the latter in its position above the tank and provided with valves for controlling the flow of water, and an absorbent covering extending over and supported by the trough and receiving the tank.

9. An apparatus of the class described including a pan provided in its front wall with a recess or outlet for the escape of water, a tank fitted in the pan, an absorbent covering receiving the tank and extending downwardly from a point above the same to the pan, means for supplying moisture to the absorbent covering, and a faucet arranged exteriorly of the fabric covering and extending through the recess or outlet of the pan and connected with the tank.

In testimony, that I claim the foregoing as my own, I have hereto affixed my signature in the presence of two witnesses.

LITTLE B. JOHNSON.

Witnesses:
CHARLIE C. HAYES,
WILLIAM E. CUNNINGHAM.

Copies of this patent may be obtained for five cents each, by addressing the "Commissioner of Patents, Washington, D. C."